UNITED STATES PATENT OFFICE.

EDWARD HUBBARD RUSSELL, OF PARK CITY, UTAH TERRITORY.

PROCESS OF SEPARATING METALS FROM ORES AND METALLURGICAL PRODUCTS AND FROM EACH OTHER.

SPECIFICATION forming part of Letters Patent No. 296,710, dated April 8, 1884.

Application filed September 28, 1882. (No specimens.)

*To all whom it may concern:*

Be it known that I, EDWARD H. RUSSELL, of Park City, in the county of Summit and Territory of Utah, have invented certain Improvements in Processes of Separating Metals from Ores and Metallurgical Products and from each other, of which the following is a specification.

The object of this invention is to effect the removal of precious metals from their ores and metallurgical products by the leaching process, and to effect the separation of the base and precious metals from each other.

To this end the invention consists in using a soluble phosphate in combination with the hyposulphite leaching solution.

In the ordinary process of leaching, compounds of precious metals are extracted from their ores or metallurgical products by leaching with a solution of hyposulphite of an alkali or alkali earth in which these compounds of the metals are soluble. Unfortunately certain compounds of the base metals, more particularly lead, are soluble in the hyposulphite solution. It has therefore hitherto been found impossible to use this process to advantage upon certain kinds of ores containing base metals, because the hyposulphite solution dissolved out the compounds both of the base and the precious metals, and it was difficult or impossible to afterward separate them thoroughly.

The object of my invention is to remove this objection to the leaching process and secure the removal of the precious and base metals from the ores or metallurgical products and separate them from each other. This I secure by adding to the hyposulphite solution containing both the precious and base metals a phosphate of an alkali—such as sodium phosphate—which precipitates nearly all the base metals by themselves, but which has no effect upon the compounds of the precious metals which remain in solution. After the base-metal compounds have settled, the solution is drawn off, and the precious metals are precipitated by themselves by any of the ordinary steps now in common use, usually as sulphides. In this way bullion is obtained in a purer condition than is possible by the old method, and the base metals, being kept separate from the precious, may be utilized, the process being thus rendered more economical than those now in use.

This process differs from that described in the application No. 34,710, filed by me May 28, 1881, in that the present process removes the base metals from the ores or products, while in the former process they were left in the ore or product and permitted to go to waste.

The agent usually employed for precipitating the precious metals is a sulphide of an alkali or an "alkali earth."

My process is intended to be used particularly in connection with ores which have been previously subjected to a chloridizing roast; but it is also applicable to some raw ores in which silver exists in a form which is soluble in the hyposulphite, and to ores which have been exposed to a chlorine action.

It is obvious that my process can be used to advantage on metallurgical products as well as in the leaching of ores.

It is also obvious that others of the well-known methods of treating ores or metallurgical products with chemical solutions to dissolve out the metals contained therein can be used in carrying out my process, instead of the leaching method, without departing from the spirit of my invention.

I do not herein claim as my invention the process of extracting metals from ores or products which consists in leaching the ore or product with a hyposulphite solution to dissolve out both the precious metals and the lead, and subsequently precipitating the lead and precious metals separately, as such process is substantially described and claimed in another application now pending, filed by me December 10, 1881, No. 47,530.

Having thus described my invention, what I claim is—

1. The process of separating precious metals and lead from ores and metallurgical products and from each other which consists in first dissolving out the metals and lead from the ore or product by means of a hyposulphite solution, and subsequently adding to the solution containing the precious metals and the lead a soluble phosphate to cause the precipitation of the lead, substantially as described.

2. The process of separating precious metals and lead from ores and metallurgical products and from each other, consisting in dissolving out from the ore or product both the precious metals and lead by means of a hyposulphite solution, adding to the resulting solution a soluble phosphate to precipitate the lead, and finally removing the solution and precipitating the precious metals therefrom, substantially as described.

3. The process of separating precious metals and lead from ores and metallurgical products and from each other which consists in leaching the ore or product with a hyposulphite solution to dissolve out both the precious metals and lead, adding to the resulting solution a soluble phosphate to precipitate the lead, and finally removing the remaining solution and precipitating the precious metals therefrom, substantially as described.

EDWARD HUBBARD RUSSELL.

Witnesses:
EDWIN KIMBALL,
WALTER ALMY.